(12) United States Patent
Wymore

(10) Patent No.: US 11,970,136 B2
(45) Date of Patent: Apr. 30, 2024

(54) ARTICULATING STEP ATTACHABLE TO HITCH RECEIVER TUBE

(71) Applicant: NAADE, Inc., Brea, CA (US)

(72) Inventor: Timothy J. Wymore, Yorba Linda, CA (US)

(73) Assignee: NAADE, Inc., Brea, CA (US)

( * ) Notice: Subject to any disclaimer, the term of this patent is extended or adjusted under 35 U.S.C. 154(b) by 267 days.

(21) Appl. No.: 17/084,253

(22) Filed: Oct. 29, 2020

(65) Prior Publication Data
US 2021/0129758 A1    May 6, 2021

Related U.S. Application Data

(60) Provisional application No. 62/930,207, filed on Nov. 4, 2019.

(51) Int. Cl.
  *B60R 3/00*   (2006.01)
  *B60D 1/52*   (2006.01)
  *B60D 1/58*   (2006.01)

(52) U.S. Cl.
  CPC .............. *B60R 3/007* (2013.01); *B60D 1/52* (2013.01); *B60D 1/58* (2013.01)

(58) Field of Classification Search
  CPC .. B60R 3/007; B60R 3/02; B60D 1/52; B60D 1/58
  See application file for complete search history.

(56) References Cited

U.S. PATENT DOCUMENTS

| | | | |
|---|---|---|---|
| 5,829,774 A | 11/1998 | Klemp | |
| D527,323 S | 8/2006 | Storer | |
| 7,114,736 B2 * | 10/2006 | Stodola | B60R 3/00 280/166 |
| D532,354 S | 11/2006 | Storer | |
| 11,192,410 B2 * | 12/2021 | MacNeil | B29C 45/1676 |
| 2001/0045720 A1 * | 11/2001 | Schlicht | B60R 3/02 280/166 |

* cited by examiner

*Primary Examiner* — Bryan A Evans
(74) *Attorney, Agent, or Firm* — Stetina Brunda Garred & Brucker

(57) ABSTRACT

A step is connectable to a receiver tube on a trailer hitch. The step includes a main body having a first surface and an opposing second surface. A resilient cover extends over the second surface. A mounting plate is connected to the main body. A mounting flange is connectable to the mounting plate. A hitch tube is connected to the mounting flange, with the hitch tube being configured to be connectable to the receiver tube on the trailer hitch. The main body is configured to be transitional relative to the hitch tube between a first position and a second position, with at least a portion of the main body moving away from the hitch tube as the main body transitions from the first position toward the second position.

20 Claims, 5 Drawing Sheets

ARTICULATING STEP ATTACHABLE TO HITCH RECEIVER TUBE

CROSS-REFERENCE TO RELATED APPLICATIONS

This application claims the benefit of U.S. Provisional Application No. 62/930,207, filed Nov. 4, 2019, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to a vehicle step, and more specifically to a step that is attachable to a receiver tube of a conventional trailer hitch and is capable of articulating between a generally upright position and a generally lowered position.

2. Description of the Related Art

Vehicles may have elevated areas that may be difficult for users to access or reach. For instance, a truck bed may be elevated off the ground, and thus, it may be difficult for users to climb into the truck bed. It is also common for vehicles to include features or accessories located on the roof. Along these lines, it is common to mount light bars, storage containers, bicycle racks, ski/snowboard racks, etc., to the roof of a vehicle. Thus, in order to access such accessories, it may be necessary to access the roof, which may be difficult, particularly on tall vehicles.

Recognizing the need to access elevated locations on a vehicle, some vehicles may include permanent side steps, extending along the sides of the vehicle. While side steps may be helpful, there may be areas of the vehicle that may not include a step, such as the rear portion of the vehicle. Furthermore, the permanent configuration of the side steps may be undesirable for some users, who may want more temporary options.

Accordingly, there is a need in the art for a step that can be attached to a vehicle and which can be selectively articulated from a generally upright configuration to a generally lowered configuration. Various aspects of the present disclosure address this particular need, as will be discussed in more detail below.

BRIEF SUMMARY

Various aspects of the present disclosure are directed to a trailer hitch mountable step that can be selectively transitioned between an upright position and a lowered position. When the step is in the upright position, the step may help in absorbing low-speed impacts (e.g., similar to a bumper) and when the step is in the lowered position, a user may stand on the step to access elevated features on or near the vehicle. The step may include an outer, resilient cover to further assist in absorbing low-speed impacts. The step may be biased toward the upright position by a spring and the step may be moved to the lowered position when the biasing force is overcome by a force applied to the step. The step may provide a desirable, temporary stepping surface in a rear location of a vehicle where a trailer hitch is typically located.

In accordance with one embodiment of the present disclosure, there is provided a selectively deployable step connectable to a receiver tube on a trailer hitch. The step includes a hitch tube configured to be connectable to the receiver tube on the trailer hitch. A mounting flange is connected to the hitch tube, and a main body is pivotally connected to the mounting flange. The main body is transitional between a first position and a second position, with at least a portion of the main body moving away from the hitch tube as the main body transitions from the first position toward the second position. The step additionally includes a resilient cover extending over at least a portion of the main body.

The main body may be biased toward the first position. The step may include a spring connected to the main body and configured to apply a biasing force to the main body which biases the main body toward the first position.

The main body may pivots between 80-100 degrees as the main body transitions between the first position and the second position.

The step may additionally include a stop arm connected to the main body, and a pin connected to the mounting flange. The stop arm may contact the pin when the main body is in the second position. The stop arm may include an arcuate surface complementary to an outer contour of the pin.

The step may include a textured surface that moves with the main body as the main body transitions between the first and second positions. The textured surface may be configured to enhance traction for a user stepping on the textured surface when the main body is in the second position. The textured surface may be formed as part of the resilient cover.

The resilient cover may be molded onto the main body and extend over opposed surfaces of the main body. The resilient cover may be formed from urethane.

According to another embodiment, there is provided a pivoting step connectable to a receiver tube. The pivoting step includes a hitch tube configured to be connectable to the receiver tube on the trailer hitch. A pin is connected to the hitch tube. The step additionally includes a main body pivotally connected to the mounting flange and transitional between a first position and a second position. At least a portion of the main body moves away from the hitch tube as the main body transitions from the first position toward the second position. A stop arm is connected to the main body. The stop arm contacts the pin when the main body is in the second position According to another embodiment, there is provided a method of assembling a step configured for selective attachment to a receiver tube of a trailer hitch. The method includes connecting a main body to a hitch tube such that the main body is pivotable relative to the hitch tube between a first position and a second position, with at least a portion of the main body moving away from the hitch tube as the main body transitions from the first position toward the second position. The hitch tube is sized and structured to be insertable within the receiver tube of the trailer hitch.

The connecting step may include connecting the main body to the hitch tube such that the main body is pivotable relative to the hitch tube by 80-100 degrees as the main body transitions between the first and second positions.

The method may also include the step of connecting a stop pin to the hitch tube, with the stop pin being configured to contact a stop arm coupled to the main body when the main body is in the second position.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Figure 1:
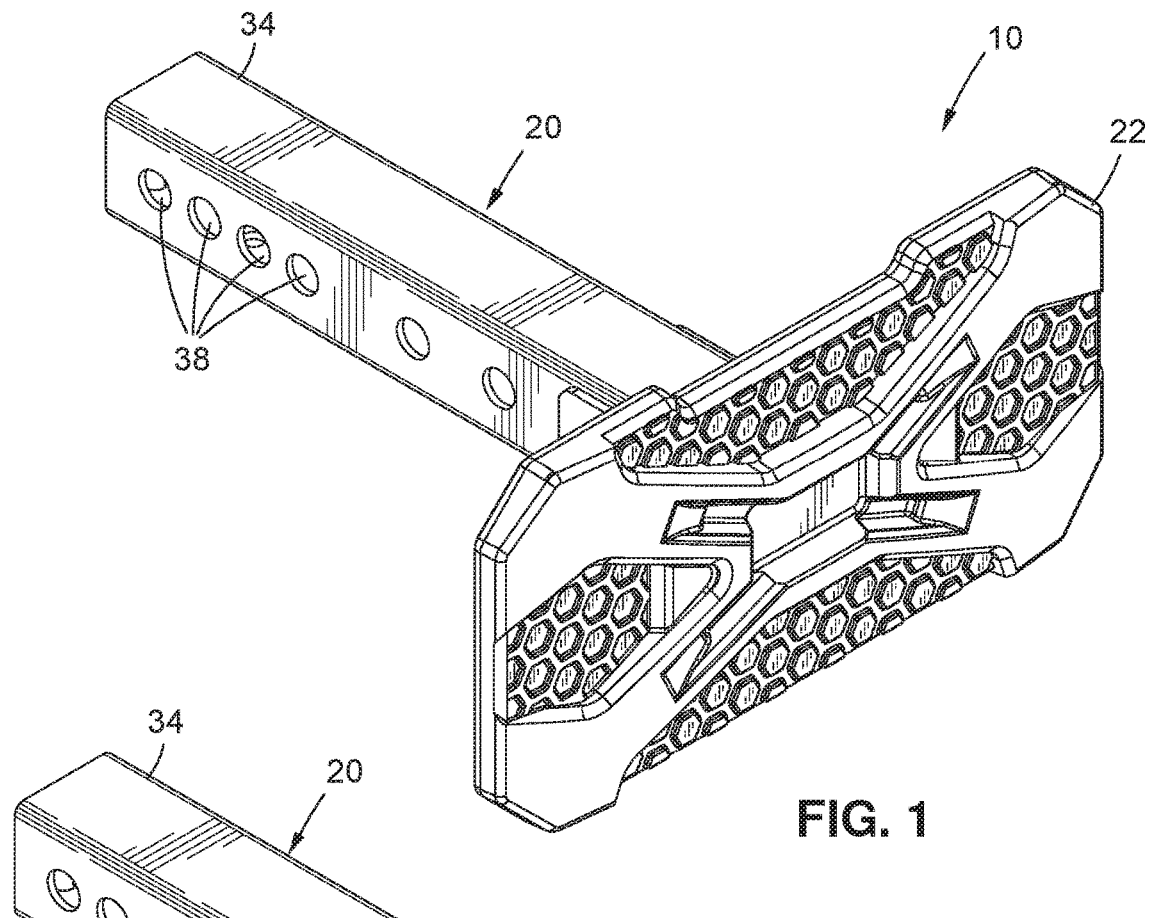
FIG. 1 is an upper perspective view of an articulating step connectable to a receiving tube of a trailer hitch, the step being in a first, upright position.
Figure 2:
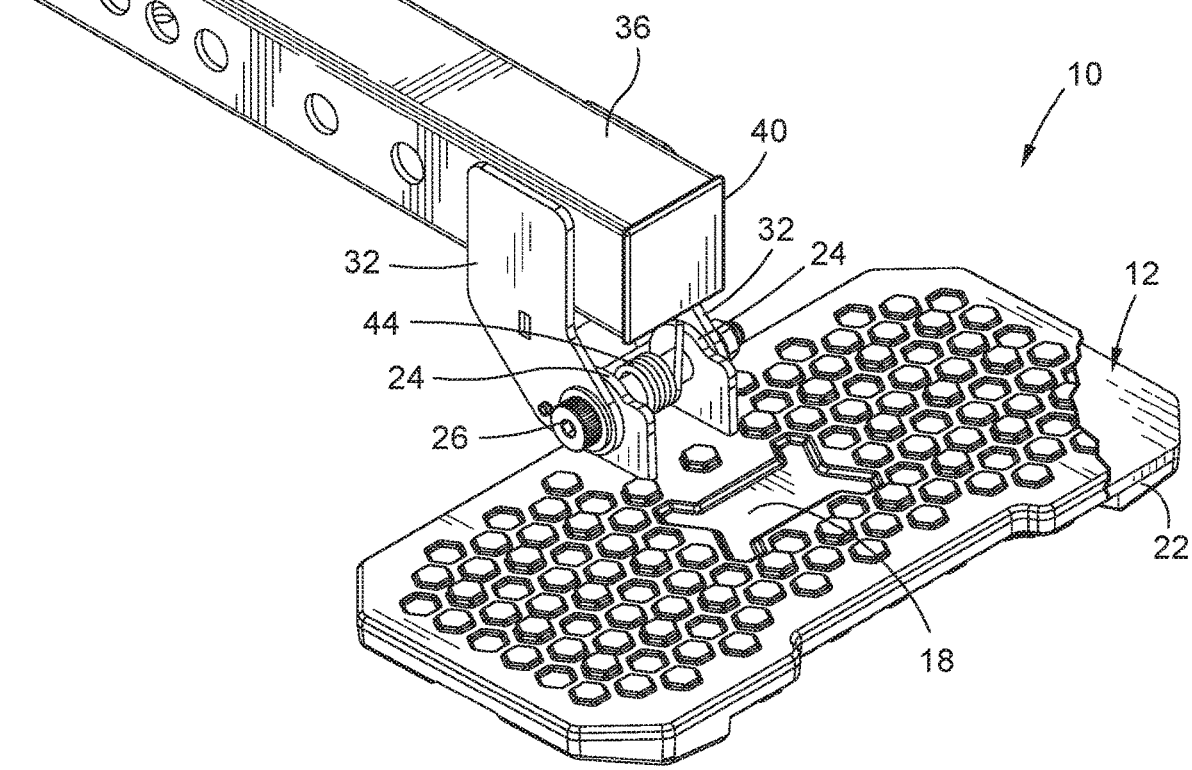
FIG. 2 is an upper perspective view of the step transitioned from the first, upright position, to a second, lowered position.
Figure 3:
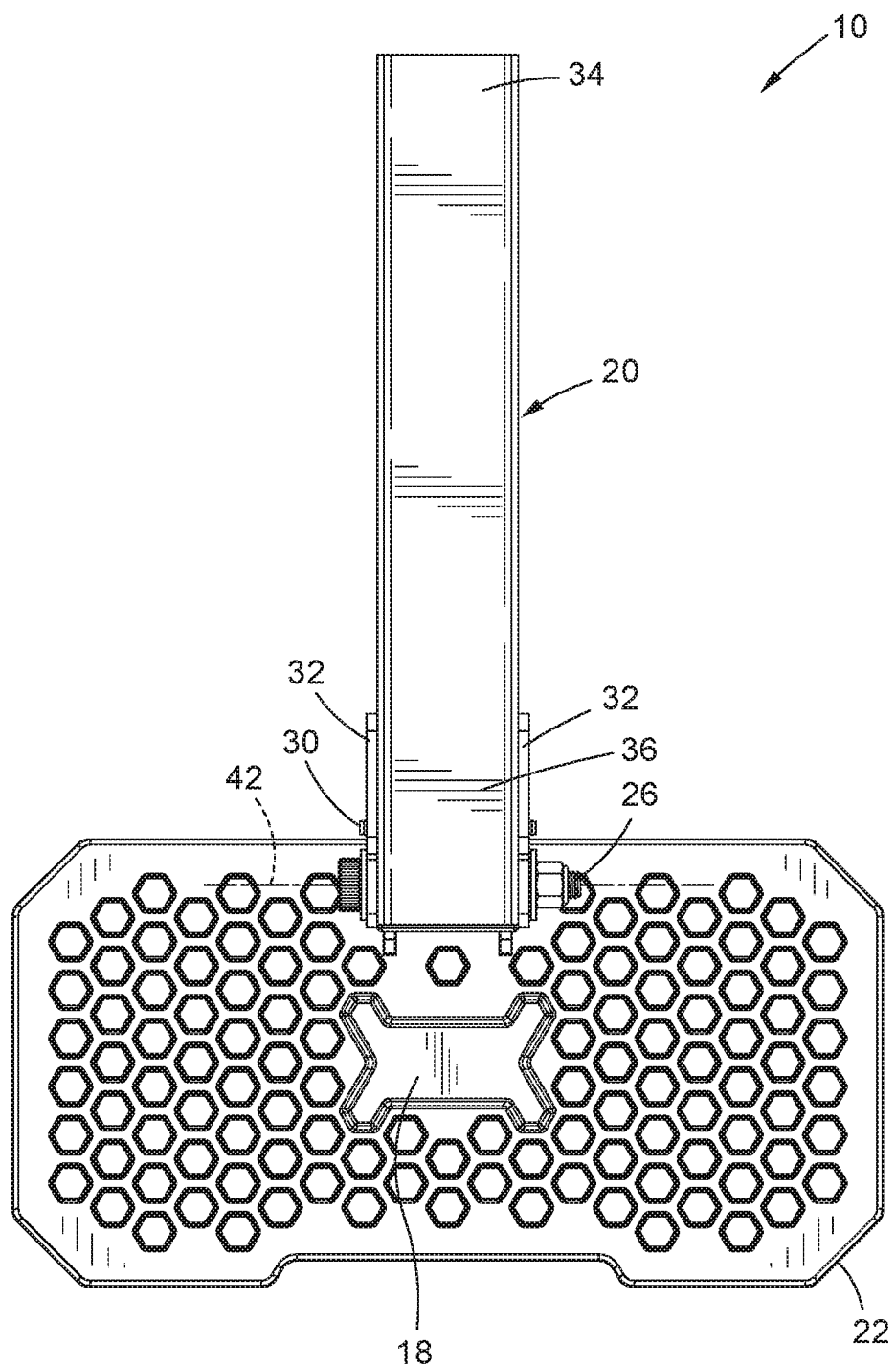
FIG. 3 is a top view of the step depicted in FIG. 2.
Figure 4:
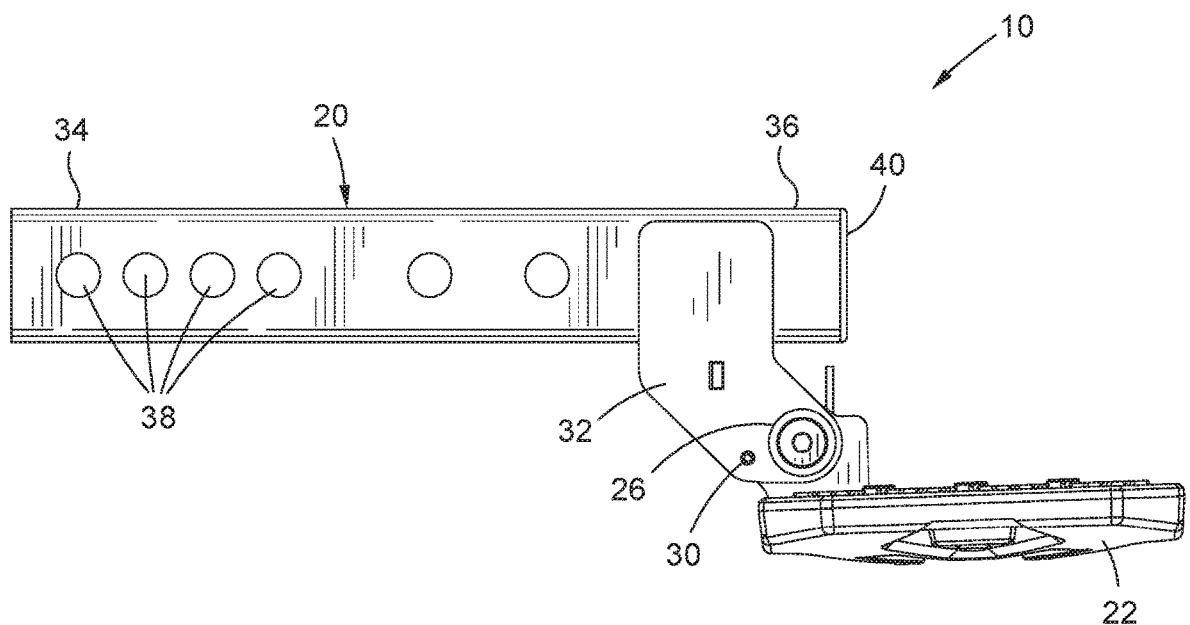
FIG. 4 is a side view of the step depicted in FIG. 2.

Referring now to the drawings, wherein the showings are for purposes of illustrating a preferred embodiment of the present disclosure, and are not for purposes of liming the same, there is depicted a spring-loaded step 10 configured to be attached to a receiver tube of a conventional trailer hitch. The step 10 can be transitioned between two operable positions, namely, an upright position and a lowered position. When in the lowered position, the step 10 may serve as a surface upon which a user may place his or her feet when trying to reach an elevated position, such as when climbing into a truck bed, reaching for a vehicle roof, or accessing a rack mounted on the vehicle roof. When in the upright position, the step 10 may function similar to a bumper to provide low speed impact protection to help keep the vehicle free of parking bumps, nicks, scratches, etc. Along these lines, the step 10 may include an outer layer formed of a resilient material, such as urethane, to enhance the ability to absorb accidental impact. Furthermore, the ability of the step 10 to be mounted via a trailer hitch may provide a stepping surface, i.e., foot step, at a location of the vehicle which typically does not include a stepping surface, such as at the rear of the vehicle.

The step 10 may include a rigid main body 12 formed of aluminum, or other materials known in the art. The main body 12 may include an inner surface (e.g., a first surface) and an opposing outer surface (e.g., a second surface). The main body 12 may be sized and strong enough to allow an adult user to place his entire weight on the step and support the user for an extended period of time without causing damage to the main body 12. The main body 12 shown in the Figures is generally quadrangular with a pair of opposed sides, a top and a bottom in opposed relation to the top. The corners have been angled to reduce a sharp corner. It is understood that the size and shape of the main body 12 may vary without departing from the spirit and scope of the present disclosure. In this regard, the main body 12 may be circular, oval, trapezoidal, or other shapes known in the art, and large enough to allow an adult user to place a foot thereon when the step 10 is in the lowered position.

The step 10 additionally preferably includes a resilient cover 22 which extends over at least a portion, and in some instances, a majority of the main body 12. The resilient cover 22 may extend completely over the outer surface, as well as substantially over the inner surface, as well as around the outer periphery of the main body 12. In this regard, the resilient cover 22 may define an outer periphery of the step 10, so as to provide a softer, more resilient outer periphery than the main body 12. In one embodiment, the resilient cover 22 is formed by overmolding urethane over the main body 12, although it is contemplated that the resilient cover 22 may be attached to the main body 12 via other means, such as through the use of mechanical fasteners and/or an adhesive. It is contemplated that urethane is just one material that may be used to form the resilient cover, and thus, other resilient materials known in the art may also be used. The resilient cover 22 may include a textured surface, particularly on the portion of the step 10 which a user places his foot, to enhance traction. The textured surface may include a plurality of nubs or protrusions, a plurality of recesses, a plurality of ribs, etc.

Figure 5:
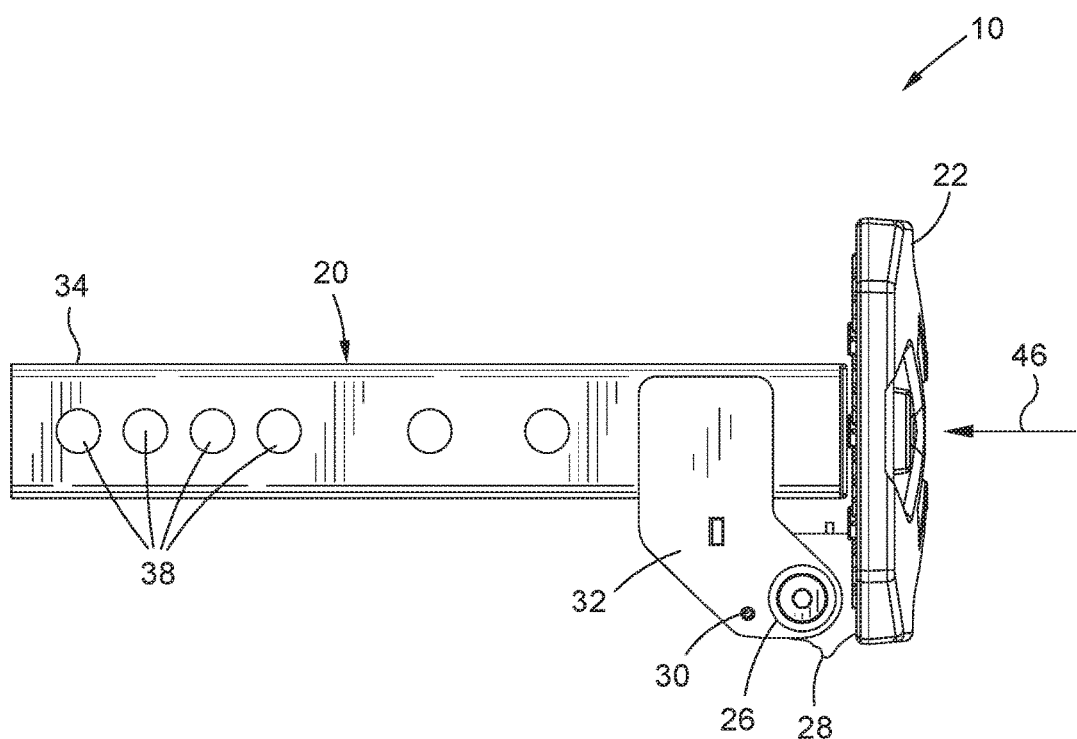
FIG. 5 is a side view of the step depicted in FIG. 1.
Figure 6:
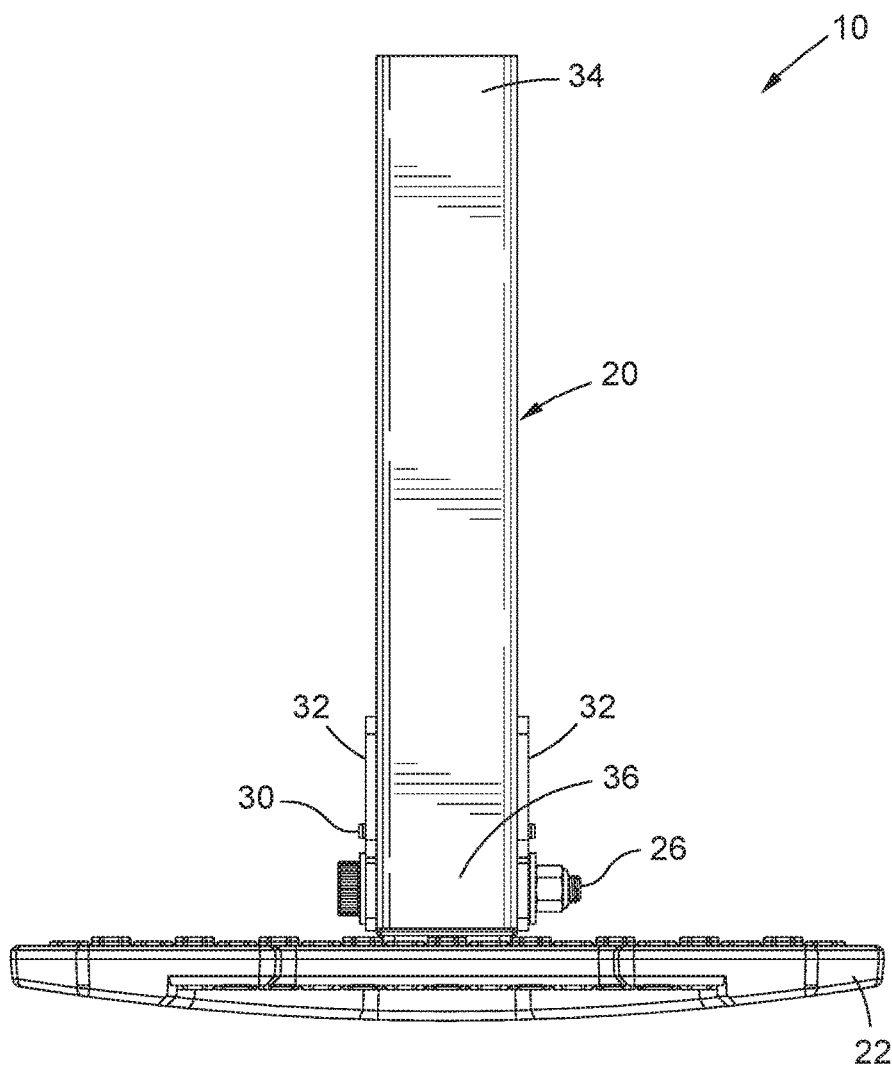
FIG. 6 is a top view of the step depicted in FIG. 1.
Figure 7:
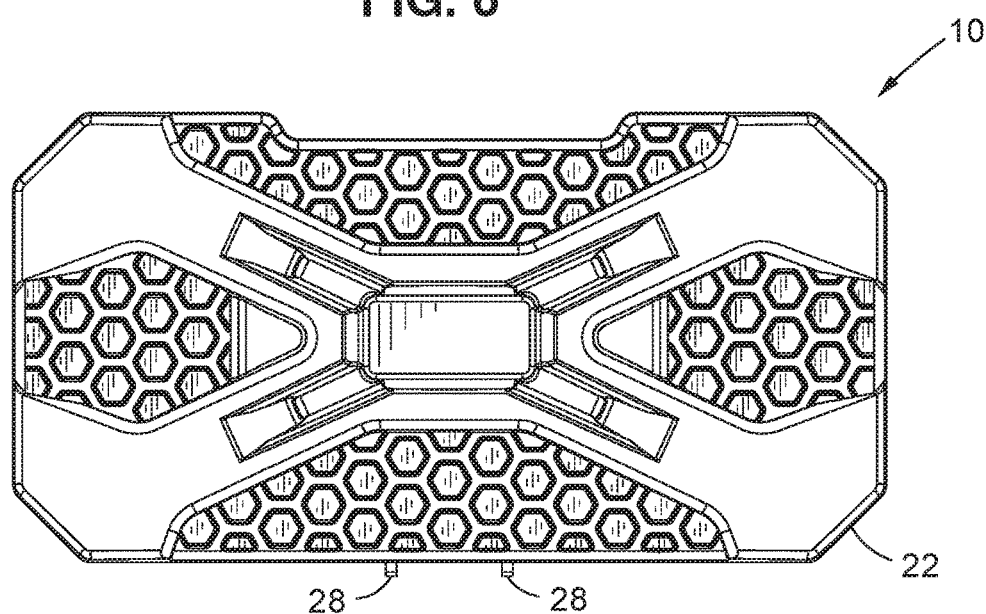
FIG. 7 is a front view of the step depicted in FIG. 1.

The step 10 may include a pair of mounting plates 24 extending from the first surface of the main body 12 in opposed relation to each other. The mounting plates 24 may be generally symmetrically disposed on opposite sides a central transverse axis of the main body 12 and may be positioned so as to not interfere with the hitch tube 20 as the step 10 transitions between the upright and lowered positions. The mounting plates 24 may be welded, adhered, or otherwise secured to the main body 12. It is also contemplated that the mounting plates 24 may be integrally formed with the main body 12 (e.g., molded with the main body 12). Each mounting plate 24 may include an aperture formed therein to accommodate a pivot pin 26, as will be discussed in more detail below. Each mounting plate 24 may additionally include a stop arm 28 (see FIG. 5) protruding slightly beyond the outer periphery of the main body 12. In this regard, the stop arm 28 may protrude by an amount that is sufficient to interface with the stop pin 30 when the step 10 is in the lowered position. The stop arm 28 may include an arcuate surface, and may be configured to contact a stop pin 30 to provide a hard stop for the main body 12 when the main body 12 is in the lowered position, as will be described in more detail below.

The step 10 may include the hitch tube 20 and a pair of mounting flanges 32 extending from the hitch tube 20. The hitch tube 20 may include a hollow interior and a quadrangular external configuration. The hitch tube 20 may be formed from steel or other suitable materials, and may be zinc plated and topped with a black textured powder coat. Other finishes may also be applied to achieve other textures or colors as may be desired. The hitch tube 20 may include a first end portion 34 configured to be inserted into the receiver tube of the trailer hitch, and a second end portion 36 connected to the mounting flanges 32. The first end portion 34 may include one or more apertures 38 extending therethrough for mounting the hitch tube 20 to the receiver tube and to allow for various distances by which the hitch tube 20 may extend from the receiver tube. The second end portion 36 may terminate at an end surface 40. It is contemplated that the second end portion 36 of the hitch tube 20 may be configured for attachment to various accessories, particularly when the main body 12 is in the lowered position. For instance, the second end portion 36 may be configured to engage with bike racks or other accessories.

The mounting flanges 32 are coupled to respective sides of the hitch tube 20 and extend downwardly therefrom. In one embodiment, the mounting flanges 32 are welded to the hitch tube 20, although other mounting techniques known in the art, such as mechanical fasteners, adhesives, etc., may also be used. The mounting flanges 32 may each include an aperture formed therein to accommodate the pivot pin 26.

The mounting flanges 32 are attached to the mounting plates 24 of the main body 12 by aligning the apertures on the mounting plates 24 with the apertures on the mounting flanges 32. The mounting plates 24 may be spaced from each other such that the mounting plates 24 may be positioned between the mounting flanges 32, with each mounting plate being disposed adjacent a respective mounting flange 32. When the apertures are aligned, a bolt or similar device may be advanced through the apertures and fastened with a nut. The bolt may function as the pivot pin 26, and thus, may define the axis 42 about which the main body 12 pivots as it transitions between the upright position and the lowered position.

The stop pin 30 may extend between the mounting flanges 32 and may be positioned so as to interface with the stop arms 28 on the mounting plates 24 when the main body 12 is in the lowered position. Along these lines, the stop pin 30 may be positioned such that the pivot pin 26 is between the stop pin 30 and the main body 12 when the main body 12 is in the upright position.

The step 10 may further include a spring 44, which is operatively connected to the main body 12 and which biases the main body 12 toward the upright position. In this regard, when the main body 12 is at rest (e.g., when a force is not applied thereto by a user), the spring 44 urges the main body 12 toward the upright position. The main body 12 may be transitioned from the upright position to the lowered position by applying a force to the main body 12 in a direction opposite to the direction of the biasing force, and at a magnitude that is greater than the biasing force. When the user removes his foot from the step (e.g., removes the force applied to the step 10), the biasing force of the spring 44 urges the main body 12 to transition from the lowered position to the upright position.

The spring 44 shown in the Figures is a coil spring, which may include one end operatively connected to a pivoting component (e.g., the main body 12 or mounting plates 24), while the other end of the spring 44 may be operatively connected to a non-pivoting component (e.g., the mounting flanges 32 or the hitch tube 20). In this regard, when the pivoting portion of the step 10 pivots relative to the non-pivoting portion of the step 10 from the upright position toward the lowered position, the spring 44 may be loaded, which increases the magnitude of the biasing force. Although a coil spring is shown in the exemplary embodiment, other types of springs or biasing mechanisms known in the art may also be used.

To install the step 10 onto the receiver tube, the first end portion 34 of the hitch tube 20 is inserted into the receiver tube and one of the apertures 38 formed on the hitch tube 20 is aligned with a corresponding aperture formed on the receiver tube. By including several apertures 38 along the hitch tube 20, the distance by which the hitch tube 20 extends from the receiver tube may be adjusted. When the desired aperture on the hitch tube 20 is alighted with the aperture on the receiver tube, a pin, bolt or other mechanical fastener may be inserted through the aligned apertures to secure the hitch tube 20 to the receiver tube.

When the step 10 is installed on the trailer hitch, the main body 12 will remain in the upright position, until a force is applied to the main body 12 which overcomes the biasing force applied by the spring 44. When the main body 12 is in the upright position, the cover 22 may contact the hitch tube 20 to reduce any noise or vibrations that would otherwise occur between metal-to-metal contact. The main body 12 may functions as a bumper when in its upright position by positioning the resilient cover 22 so as to absorb low-speed, inadvertent contact with adjacent vehicles or structures. In the event impact occurs in the direction of arrow 46, shown in FIG. 5, the force of the impact is absorbed by the resilient cover 22 and any remaining force may be transferred directly to the hitch tube 20.

If the user wants to use the step 10 as a stepping surface, the user presses with the user's foot or hand on the main body 12 in a generally downward and rearward direction which causes the main body 12 to pivot about the pivot pin 26, away from the hitch tube 20. The main body 12 pivots relative to the hitch tube 20 until the stop arms 28 on the mounting plates 24 contact the stop pin 30 connected to the mounting flanges 32. With the main body 12 in the lowered position, the user may step on the main body 12, with the load applied on the main body 12 by the user being transferred to the hitch tube 20 via the engagement between the mounting plates 24 and the mounting flanges 32.

With the user standing on the step 10, the step 10 remains in the lowered position. As soon as the user steps off the step 10, such as when the user steps into a truck bed, or steps back onto the ground, the biasing force applied to the main body 12 by the spring 44 urges the main body 12 to return to the upright position. In particular, the main body 12 pivots relative to the hitch tube 20 in a direction toward the hitch tube 20. As the main body 12 approaches the upright position, the pad 18 contacts the hitch tube 20 to soften the contact with the hitch tube 20 as well as mitigate any unwanted vibration to vehicle operation.

Figure 8:
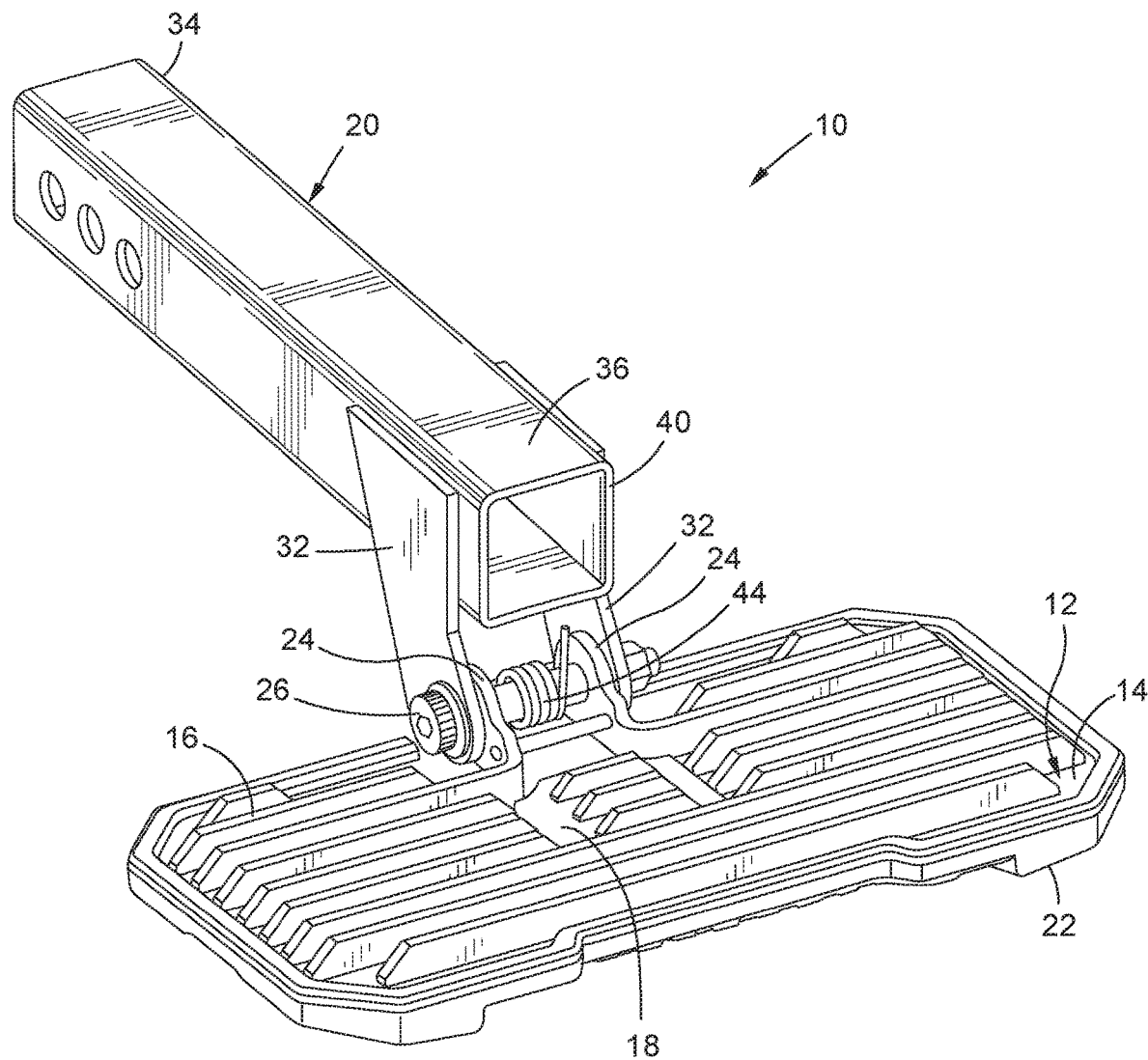
FIG. 8 is an upper perspective view of another embodiment of the step in a lowered position, with the step including a plurality of exposed ribs.

Referring now to FIG. 8, there is shown an alternative embodiment, wherein the cover 22 may not extend across the entirety of the step. Rather, as shown in FIG. 8, a portion of the main body 12 (e.g., the back side) may be uncovered and the main body 12 may include a plurality of raised ribs 16 extending from the first surface 14. Each rib 16 may extend from the first surface 14 and terminate at a distal surface. The height of each rib 16 may defined by the distance between the distal surface and the first surface 14. The ribs 16 may be arranged in a grate-like configuration, wherein the ribs 16 are generally parallel to each other and the height of the ribs 16 is generally uniform. The grate-like configuration of the ribs 16 may enhance traction when a user steps on the ribs 16, while also allowing snow, ice and mud to drain when the step 10 is in the lowered position, as will be discussed in more detail below.

The main body 12 may include a central region, wherein the ribs 16 are disrupted to accommodate a pad 18 to soften the contact between the main body 12 and a hitch tube 20. In the exemplary embodiment, the pad 18 is formed by overmolding a urethane body within the void created by the disrupted ribs 16. The configuration of the pad 18 may be complementary to the configuration of the hitch tube 20, such that when the step 10 is in the raised position, the pad 18 contacts the hitch tube 20, rather than having metal-on-metal contact between the main body 12 and the hitch tube 20.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A selectively deployable step connectable to a receiver tube on a trailer hitch, the step comprising:
   a hitch tube configured to be connectable to the receiver tube on the trailer hitch, the hitch tube having an end surface;
   a mounting flange connected to the hitch tube in spaced relation to the end surface;
   a main body pivotally connected to the mounting flange and transitional between a first position and a second position, the main body being configured to extend over the end surface of the hitch tube when the main body is in the first position, at least a portion of the main body moving away from the hitch tube as the main body transitions from the first position toward the second position such that at least a portion of the end surface of the hitch tube is uncovered by the main body when the main body is in the second position;
   a spring connected to the main body and the mounting flange, the spring being configured to apply a biasing force to the main body which biases the main body toward the first position; and
   a resilient cover extending over at least a portion of the main body.

2. The step recited in claim 1, wherein the main body pivots between 80-100 degrees as the main body transitions between the first position and the second position.

3. The step recited in claim 1, further comprising:
   a stop arm connected to the main body; and
   a pin connected to the mounting flange;
   the stop arm contacting the pin when the main body is in the second position.

4. The step recited in claim 3, wherein the stop arm includes an arcuate surface complementary to an outer contour of the pin.

5. The step recited in claim 1, further comprising a textured surface that moves with the main body as the main body transitions between the first and second positions, the textured surface being configured to enhance traction for a user stepping on the textured surface when the main body is in the second position.

6. The step recited in claim 5, wherein the textured surface is formed as part of the resilient cover.

7. The step recited in claim 1, wherein the resilient cover is molded onto the main body and extends over opposed surfaces of the main body.

8. The step recited in claim 7, wherein the resilient cover is formed from urethane.

9. A pivoting step connectable to a receiver tube, the pivoting step comprising:
   a hitch tube configured to be connectable to the receiver tube on the trailer hitch, the hitch tube having an end surface;
   a mounting flange connected to the hitch tube in spaced relation to the end surface;
   a pin connected to the mounting flange;
   a main body pivotally connected to the hitch tube and transitional between a first position and a second position, the main body being configured to extend over the end surface of the hitch tube when the main body is in the first position, at least a portion of the main body moving away from the hitch tube as the main body transitions from the first position toward the second position such that at least a portion of the end surface of the hitch tube is uncovered by the main body when the main body is in the second position;
   a textured surface that moves with the main body as the main body transitions between the first and second positions, the textured surface being configured to enhance traction for a user stepping on the textured surface when the main body is in the second position; and
   a stop arm connected to the main body;
   the stop arm contacting the pin when the main body is in the second position.

10. The step recited in claim 9, wherein the main body is biased toward the first position.

11. The step recited in claim 10, further comprising a spring connected to the main body and configured to apply a biasing force to the main body which biases the main body toward the first position.

12. The step recited in claim 9, wherein the main body pivots between 80-100 degrees as the main body transitions between the first position and the second position.

13. The step recited in claim 9, wherein the stop arm includes an arcuate surface complementary to an outer contour of the pin.

14. A selectively deployable step connectable to a receiver tube on a trailer hitch, the step comprising:
   a hitch tube configured to be connectable to the receiver tube on the trailer hitch, the hitch tube having an end surface;
   a mounting flange connected to the hitch tube in spaced relation to the end surface;
   a main body pivotally connected to the mounting flange and transitional between a substantially vertical position and a substantially horizontal position, the main body being configured to extend over the end surface of the hitch tube when the main body is in the substantially vertical position, at least a portion of the main body moving away from the hitch tube as the main body transitions from the substantially vertical position toward the substantially horizontal position such that at least a portion of the end surface of the hitch tube is uncovered by the main body when the main body is in the substantially horizontal position; and
   a resilient cover extending over at least a portion of the main body.

15. The step recited in claim 14, wherein the main body is biased toward the substantially vertical position.

16. The step recited in claim 15, further comprising a spring connected to the main body and the mounting flange, the spring being configured to apply a biasing force to the main body which biases the main body toward the substantially vertical position.

17. The step recited in claim 14, further comprising a textured surface that moves with the main body as the main body transitions between the substantially vertical position and the substantially horizontal position, the textured surface being configured to enhance traction for a user stepping on the textured surface when the main body is in the substantially horizontal position.

18. The step recited in claim 17, wherein the textured surface is formed as part of the resilient cover.

19. The step recited in claim 14, further comprising:
   a stop arm connected to the main body; and
   a pin connected to the mounting flange;

the stop arm contacting the pin when the main body is in the substantially horizontal position.

20. The step recited in claim 19, wherein the stop arm includes an arcuate surface complementary to an outer contour of the pin.

\* \* \* \* \*